US008950569B1

(12) United States Patent
Hanks et al.

(10) Patent No.: US 8,950,569 B1
(45) Date of Patent: Feb. 10, 2015

(54) CONVEYING DEVICE AND PROCESS FOR OPERATING THE SAME

(75) Inventors: Jason Leslie Hanks, Newport, WA (US); Andrew Thad Marvin, Emmett, ID (US); Bruce Eddward Wadsworth, Mead, WA (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 14/007,162

(22) PCT Filed: Mar. 29, 2012

(86) PCT No.: PCT/US2012/031195
§ 371 (c)(1),
(2), (4) Date: Aug. 29, 2014

(87) PCT Pub. No.: WO2012/135488
PCT Pub. Date: Oct. 4, 2012

Related U.S. Application Data

(60) Provisional application No. 61/468,698, filed on Mar. 29, 2011.

(51) Int. Cl.
*B65G 47/94* (2006.01)
*B65G 41/02* (2006.01)
(Continued)

(52) U.S. Cl.
CPC ............... *B65G 23/04* (2013.01); *B65G 15/00* (2013.01); *B65G 47/945* (2013.01); *B65G 41/02* (2013.01)
USPC ............................ 198/585; 198/364; 198/315

(58) Field of Classification Search
CPC .... B65G 47/94; B65G 47/945; B65G 47/641; B65G 41/02
USPC ......................................... 198/315, 364, 585
See application file for complete search history.

(56) References Cited

U.S. PATENT DOCUMENTS

| 1,585,694 | A | * | 5/1926 | Schoew ........................ 198/585 |
| 2,730,228 | A | * | 1/1956 | Greeley et al. ................ 198/364 |
| 3,348,663 | A | | 10/1967 | Schmieder |

(Continued)

FOREIGN PATENT DOCUMENTS

| DE | 972092 C | 5/1959 |
| DE | 3643937.1 A1 | 9/1987 |

OTHER PUBLICATIONS

The International Search Report and Written Opinion dated Jun. 27, 2012, 8 pages.

*Primary Examiner* — Mark A Deuble
(74) *Attorney, Agent, or Firm* — Matthew R. Weaver; Aaron M. Pile; Jeffrey A. Sharp

(57) ABSTRACT

A direct engagement drive system [108] for a tripper conveyor system is disclosed. The drive system [108] comprises lead [140'] and follow [140"] cogwheels, each driven by a programmable logic controller [108q] and variable frequency drive-controlled electric motor [108a]. The torque applied to each of the lead [140'] and follow [140"] cogwheels varies as a function of loading experienced by the cogwheels [140] and as a function of the location of the cogwheels [140] relative to a gap [159] or other discontinuity in a cog rail [150] provided on a conveyor [110]. A process for moving a tripper [100] along a conveyor [110] is also disclosed. Other mobile conveying device such as mobile hoppers, maintenance vehicles, stacking machines, conveying devices, or cranes may employ the drive systems [108] shown and described.

19 Claims, 13 Drawing Sheets

(51) Int. Cl.
   *B65G 23/04* (2006.01)
   *B65G 15/00* (2006.01)

(56) References Cited

U.S. PATENT DOCUMENTS 3,533,498 A * 10/1970 Weir .............................. 156/540

5,437,295 A    8/1995  Brown et al.
5,992,913 A    11/1999 Becker et al.
6,021,889 A *  2/2000  Tingskog ...................... 198/812
6,098,780 A    8/2000  Kelly et al.
7,413,057 B2   8/2008  Ellison, Jr. et al.
7,845,487 B1   12/2010 Fischer

* cited by examiner

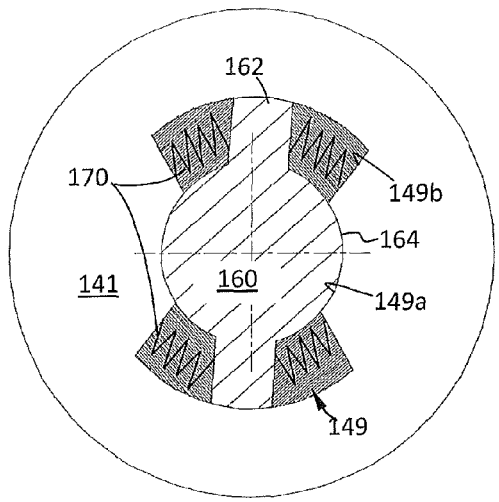
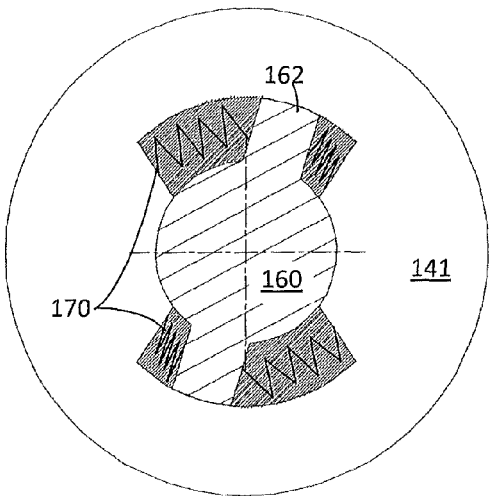
FIG. 14a
FIG. 14b
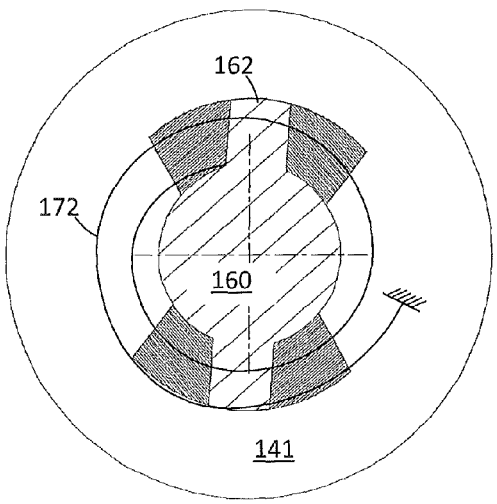
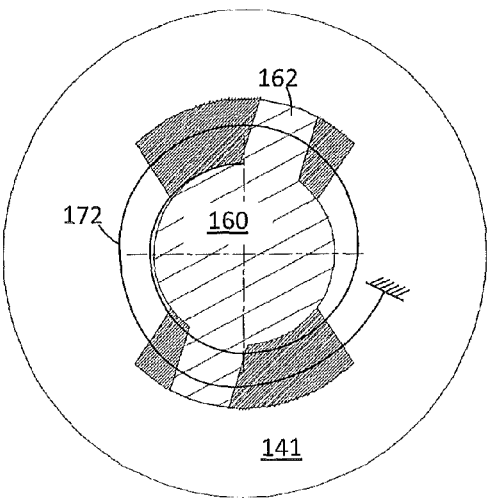
FIG. 15a
FIG. 15b

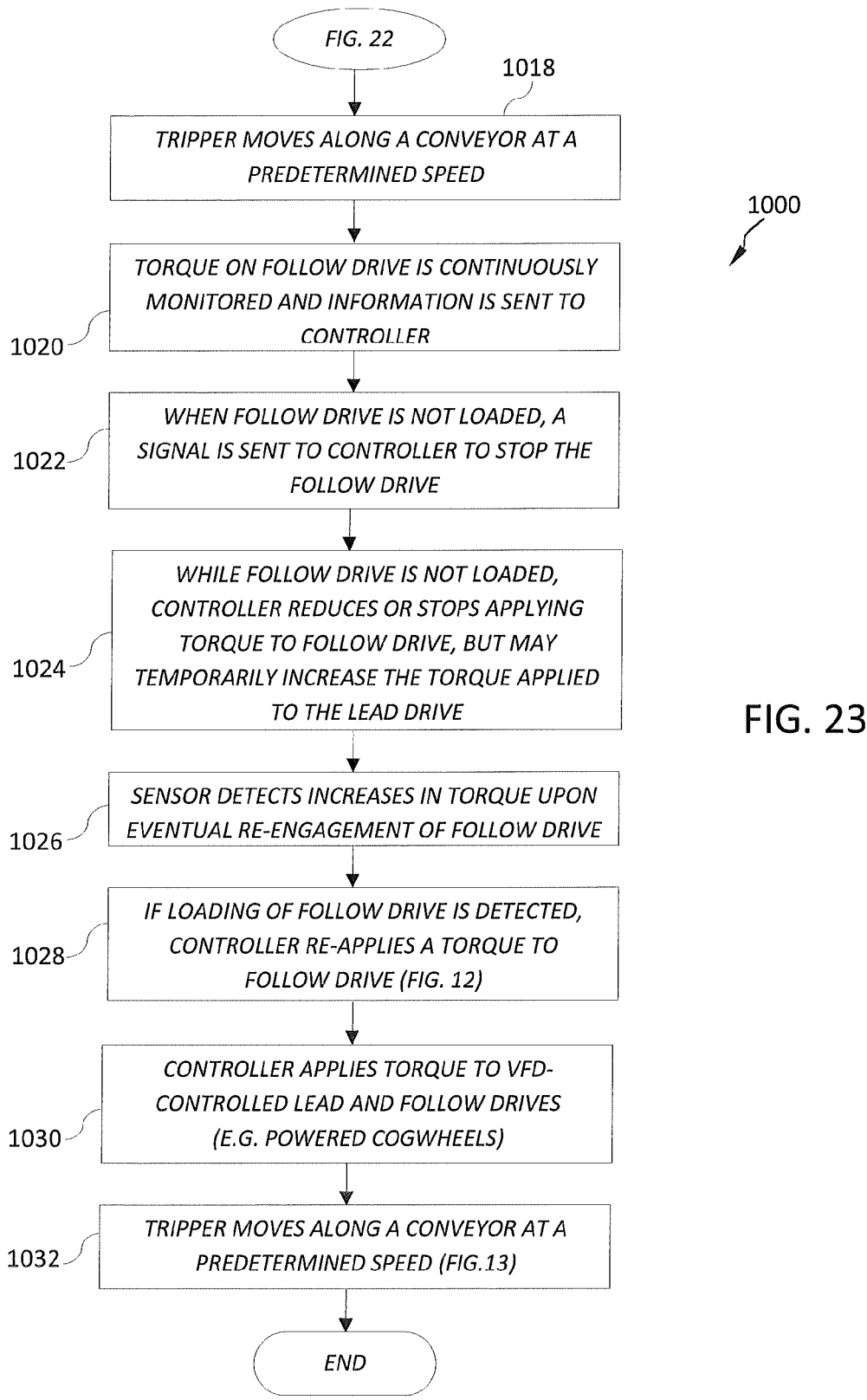

CONVEYING DEVICE AND PROCESS FOR OPERATING THE SAME

BACKGROUND OF THE INVENTION

This invention relates to conveying equipment and more particularly to tripper conveyor systems used, for instance, in the mining, aggregate, agriculture, cement, waste management, and construction industries.

A tripper is a type of industrial conveyor typically used in construction, mining, and other large-scale earth-moving businesses. For example, trippers may be used in conjunction with overland conveyor systems for mobile stacking of leach pads and storage piles. Such trippers uniformly spread mined material at variable heights over a predetermined area, facilitating leaching processes. Also known as a "tiered conveyor" or a "stepped conveyor", a tripper provides flexibility within mobile materials handling systems as it rides on rails provided on a conveyor frame and travels forward or backward along the conveyor as needed. This allows the tripper conveyor system to load material onto a selected loading area of a transportation vessel or stacking/storage pile. Tripper conveyor systems are typically constructed of steel with solid trolley wheels, a rubber lagged drive roller, heavy-duty bearings on rollers, and a belt resting on said rollers which typically range from 36 to 96 inches in width and up to several miles in length. For longer belt tripper conveyor systems, the conveyor may be formed by hinging multiple conveyor frame sections together. Belts may include tall ridges or flaps affixed laterally to their faces in order to keep transported materials from sliding back down the conveyor. Trippers typically comprise a pulley system which maintains tension on the belt regardless of its position with respect to the conveyor frame, and a transverse belt which changes the direction of material to be generally perpendicular to the conveyor. Eventually, the material discharges from the transverse belt a distance away from the conveyor. Multiple electric motors coupled with a motor brake are used to move and stop the tripper car.

To this end, there are generally two types of drive systems for trippers: standard (friction) induction drives, and capstan (cable/pulley) drives. Standard induction drives are typically overhead crane wheel assemblies which are fitted to the tripper chassis. They rely on the weight of the tripper and friction-induced traction between the conveyor rails and the tripper wheels to move and stop. Capstan drives typically rely on cable tension and friction between the cable and a complicated system of motor-driven sheaves to move the tripper.

Some mining work sites require tripper conveyor systems to operate on slopes that exceed the recommended limit of 7% grade (4 degree angle slope) for standard induction drives. In these situations, manufacturers normally eliminate the direct wheel drives, and use non-driven idle crane wheel assemblies in combination with capstan drives, pulleys, and specially-designed cables (e.g., with plastic inner core and outer braided wire strands/fibers).

Problems associated with the abovementioned conventional tripper drives are numerous. For instance, as suggested in FIG. 21, standard induction drives are not recommended to operate with wheel rails 816 inclined greater than 7% grade (approximately 4 degrees from horizontal). Particularly in adverse weather conditions or high dust environments inherent to mining operations, higher inclination angles might not be possible to do decreased friction between the conveyor wheel rails 816 and trolley wheels. Such limits reduce the mobility and versatility of a tripper conveyor system. Moreover, when using standard induction drives, if the tripper brakes fail, the tripper may not stop when in a parked position, causing a potential hazardous "sliding" situation. Lastly, delays in starting, stopping, and reversing movement of the tripper as well as "wheel slip", "sliding", or "spinning out" may be experienced as a result of constantly changing coefficients of friction between the drive wheels and wheel rail 816.

Moreover, while capstan drive systems afford greater operational inclination angles than standard induction drives, they are expensive and require expensive, specially-designed, cables which need to be replaced approximately every six months. The cables are constantly exposed to high abrasion, rely on a coefficient of friction that is dependent on cable tension, attract dirt when greased, and tend to stretch under heavy loads thereby providing a delayed or indiscernible starting and stopping response when moving or reversing the tripper. Delays in starting, stopping, and reversing movement of the tripper as well as "wheel slip", "sliding", or "spinning out" may be experienced as a result of dirt, dust, or debris getting caught in circumferential grooves between the pulleys, and the cable.

Moreover, while cable lengths can be shortened, they cannot be elongated without changing the uniformity of cable properties. Therefore, capstan drives lack total mobility and versatility because conveyors must be kept the same predetermined length for the life of the cable, unless the tripper conveyor system is shut down temporarily for cable maintenance, adjustment, or replacement. Additionally, when it comes to "retrofitting" a tripper for use in steeper grades and rough terrain, a capstan upgrade is not typically a good option, since conveyor frames for use with capstan drives are typically initially made wider to accommodate and protect cables and also to allow some small misalignment between multiple conveyor sections without significant penalty (e.g., cable abrasion).

Capstan cables are typically tensioned from one end of a linked assembly of conveyor frame sections to an opposite end of the linked assembly, and conveyor frame sections tend to meander back and forth to some degree between these two endpoints while in operation. Therefore, especially in instances of significant terrain or inadvertent movement of conveyor frame sections, relative angles between hinged conveyor frame sections can become so severe that the cable can become slack or even severed between the wheels and wheel rail 816. For example, in some instances, multiple conveyor frame sections may form a curved conveyor profile, wherein the cable is taught and follows a straight cable path or the cable is slack and meandering over the rail which leads to wear. Such instances may pose great safety concerns for operators and increased risks to investors regarding unscheduled downtime for repairs and unexpected capital/maintenance costs. Moreover, if a cable fails while under tension, it can become an extremely dangerous moving object for nearby operators.

OBJECTS OF THE INVENTION

It is, therefore, an object of the invention to provide an improved tripper conveyor drive system which is configured for use in areas having steep or highly varied terrain or topography;

It is another object of the invention to improve the efficiency of current mobile conveying systems and processes by providing a "direct engagement" between the tripper and conveyor without the need for cables and complex pulley systems.

Yet another object of the invention is to prevent or minimize machine downtime, capital costs, and maintenance costs.

Another object of the invention is to maximize safety and control of tripper conveyor systems.

Another object of the invention is to provide a tripper drive system which costs less, has a smaller footprint, is more versatile, and is less complex than conventional tripper drive systems.

Another object of the invention is to provide a tripper drive system which is configured to operate at higher inclination angles than conventional tripper drive systems, without requiring downtime and capital expenditure for lengthening, shortening, or replacing cables.

It is another object of the invention to provide a retrofit kit for modifying a tripper or tripper drive system which is readily compatible with existing conventional tripper conveyors.

Another object of the invention is to provide a tripper drive system having "direct drive engagement" with a conveyor.

It is also an object of the invention to provide a tripper drive which is configured to traverse gaps between conveyor frame sections and a method of moving a tripper across a gap.

These and other objects of the invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A conveyor system is provided. The system comprises, in accordance with some embodiments of the invention, a mobile device having a drive system with at least one wheel, at least one rotating transmission member, and at least one drive motor configured to drive and control rotation of said at least one rotating transmission member. The at least one rotating transmission member is configured to engage a toothed rail or rack provided on a conveyor to move the tripper in relation to the conveyor.

In some embodiments, the at least one rotating transmission member may comprise a cogwheel, a pinion, or a worm gear having a swept chamfer in order to shed material and prevent clogging. In other embodiments, the at least one rotating transmission member may comprise a lead transmission member and a follow transmission member which rotate independently. The lead transmission member and follow transmission member may be controlled by a controller and a variable frequency drive. A spring hub adapted to transmit a torque from a drive shaft but still allow some degree of rotational movement between the at least one rotating transmission member and said drive shaft 160 may be provided. The mobile device may be configured to operate on a conveyor oriented at inclination angles between approximately 0 and 14 degrees with respect to horizontal. The mobile device may comprise a tripper, a mobile hopper, a maintenance vehicle, a stacking machine, a conveying device, or a crane, without limitation.

A conveyor for continuous mobile stacking is also disclosed. The conveyor comprises, in accordance with some embodiments, one or more conveyor frame sections configured to be joined together, each conveyor frame section comprising a wheel rail for supporting a rail wheel, and at least one elongated transmission member. The at least one elongated transmission member is configured to operatively engage a toothed or threaded rotating transmission member such as a cogwheel, pinion, or worm provided on a tripper, in order to move the tripper in relation to the conveyor.

In some embodiments, the conveyor is configured to safely operate at positive and negative inclination angles between approximately 0 and 14 degrees with respect to horizontal. The at least one elongated transmission member comprises a plurality of teeth and valleys disposed between said teeth which may be configured to mesh with threads of a worm, or teeth of a cogwheel or lantern pinion. Swept chamfers may be provided to the at least one elongated transmission member in order to shed material and prevent clogging A method of moving at tripper along a conveyor is also disclosed. The method comprises, in accordance with some embodiments, providing a tripper having a drive system, wherein the drive system comprises a controller, a sensor, a first rotating transmission member operatively coupled to a first drive motor, and a second rotating transmission member operatively coupled to a second drive motor and spaced from the first rotating transmission member. The method further comprises providing a conveyor having a first conveyor frame section joined to a second conveyor frame section—the first conveyor frame section comprising a first elongated transmission member and the second conveyor frame section comprising a second elongated transmission member, wherein a gap is defined between the first elongated transmission member and the second elongated transmission member. Further steps include reducing or stopping a torque applied to at least one of the first or second rotating transmission members when said at least one of the first or second rotating transmission members is proximate the gap, but not engaged with one of the first or second elongated transmission members. A torque applied to the first rotating transmission member may be maintained or increased when the first rotating transmission member is engaged with one of the first or second elongated transmission members.

In some embodiments, the step of reducing or stopping a torque applied to at least one of the first or second rotating transmission members may be performed when said at least one of the first or second rotating transmission members is proximate the gap, but slightly disengaged with one of the first or second elongated transmission members. In some embodiments, the step of maintaining or increasing a torque applied to at least one of the first or second rotating transmission members may be performed when said at least one of the first or second rotating transmission members is proximate the gap, but slightly re-engaged with one of the first or second elongated transmission members. Lastly, the method may comprise providing a spring hub to at least one of the first rotating transmission member and the second rotating transmission member in order to compensate for small misalignments with said first and second elongated transmission members.

A conveyor system is also disclosed. The system comprises, in accordance with some embodiments, a mobile conveying device having drive system, a controller, a sensor, a first rotating transmission member operatively coupled to a first drive motor, and a second rotating transmission member operatively coupled to a second drive motor and spaced from the first rotating transmission member. The tripper conveyor system further comprises a conveyor having a first conveyor frame section joined to a second conveyor frame section, a first elongated transmission member provided on the first conveyor frame section and a second elongated transmission member provided on the second conveyor frame section, wherein a gap is defined between the first elongated transmission member and the second elongated transmission member. The drive system may be configured to reduce or stop a torque applied to the first or second rotating transmission member when said first or second rotating transmission member is proximate the gap, but not fully engaged with one of the first or second elongated transmission members. The drive system may also be configured to maintain or increase a torque applied to the first or second rotating transmission member when said first or second rotating transmission member is fully or partially engaged with one of the first or second elongated transmission members. The mobile device may comprise a tripper, a mobile hopper, a maintenance vehicle, a stacking machine, a conveying device, or a crane, without limitation.

In some embodiments, the first and second rotating transmission members may comprise a cogwheel, a pinion, or a worm gear. Moreover, the first and second elongated transmission members may comprise a cog rail or rack. A spring hub may be provided to at least one of the first rotating transmission member and the second rotating transmission member to manage small misalignments between the rotating and elongated transmission members. In other embodiments, the drive system may comprise a first drive shaft connecting the first rotating transmission member to the first drive motor, and a second drive shaft connecting the second rotating transmission member to the second drive motor, wherein each of the first and second drive shafts support a rail wheel which is independent of and which spins freely around its respective drive shaft.

A drive system for a mobile conveying device such as a tripper is also disclosed. The drive system comprises, in accordance with some embodiments, at least one rotating transmission member configured to mate with an elongated transmission member. The at least one rotating transmission member may be configured to engage a toothed rail or rack provided on a conveyor. In some embodiments, the drive system may be provided as a retrofit kit configured to modify an existing tripper. In other embodiments, the retrofit kit may include one or more elongated transmission members configured to be added to existing conventional conveyors. The one or more elongated transmission members may comprise a plurality of alternating teeth and valleys. In some embodiments, the at least one rotating transmission member may be a cogwheel, pinion, or worm without limitation. The at least one rotating transmission member and/or the at least one elongated transmission member may comprise a swept chamfer in order to shed material and prevent clogging. Moreover, the at least one rotating transmission member may include a spring hub to compensate for misalignments.

BRIEF DESCRIPTION OF THE DRAWINGS

FIGS. 14*a* and 14*b* schematically illustrate the function of a shock-absorbing, impact-tolerant, self-aligning spring hub for a tripper drive system according to some embodiments;

FIGS. 15*a* and 15*b* schematically illustrate the function of a shock-absorbing, impact-tolerant, self-aligning spring hub for a tripper drive system according to other embodiments;

FIGS. 22 and 23 schematically illustrate an operational process for a tripper drive system according to some embodiments.

DETAILED DESCRIPTION OF THE INVENTION

Figure 1:
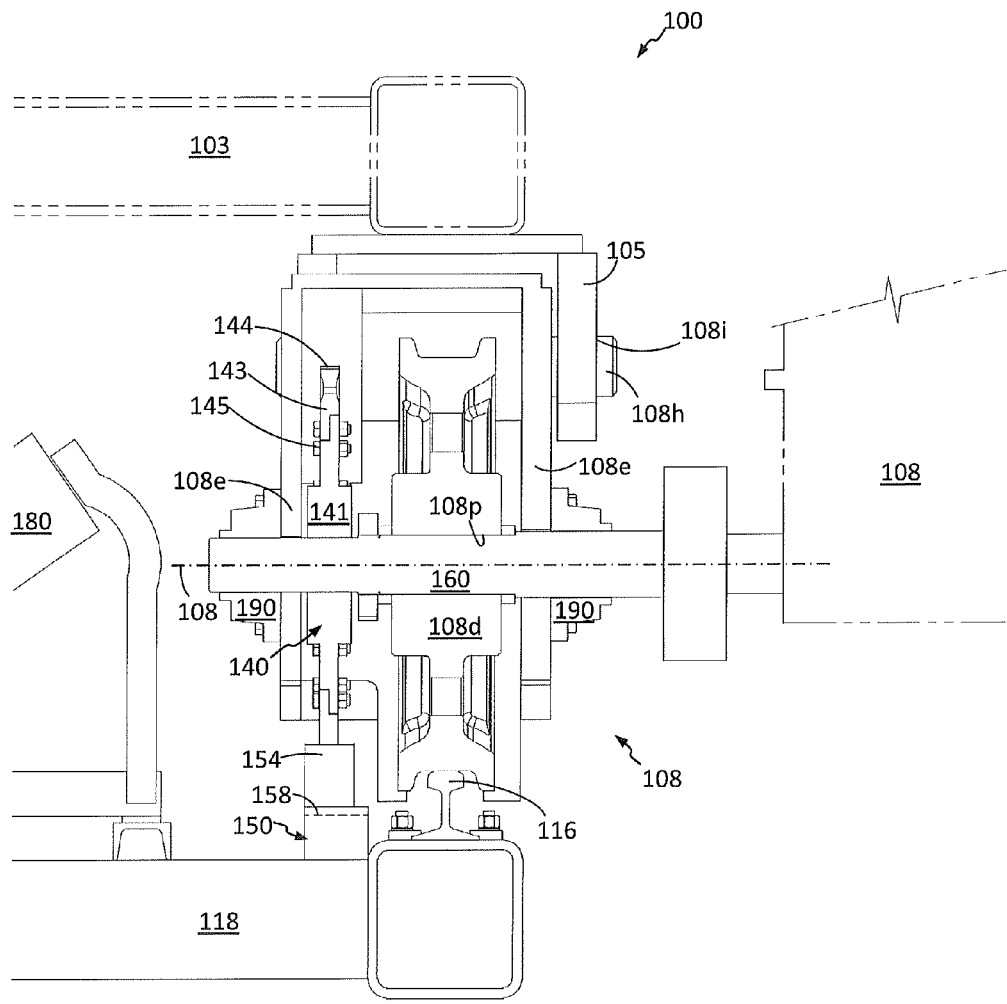
FIG. 1 is a transverse cross-section of a drive system for a tripper according to some embodiments, as viewed from the section line shown in FIG. 3.
Figure 2:
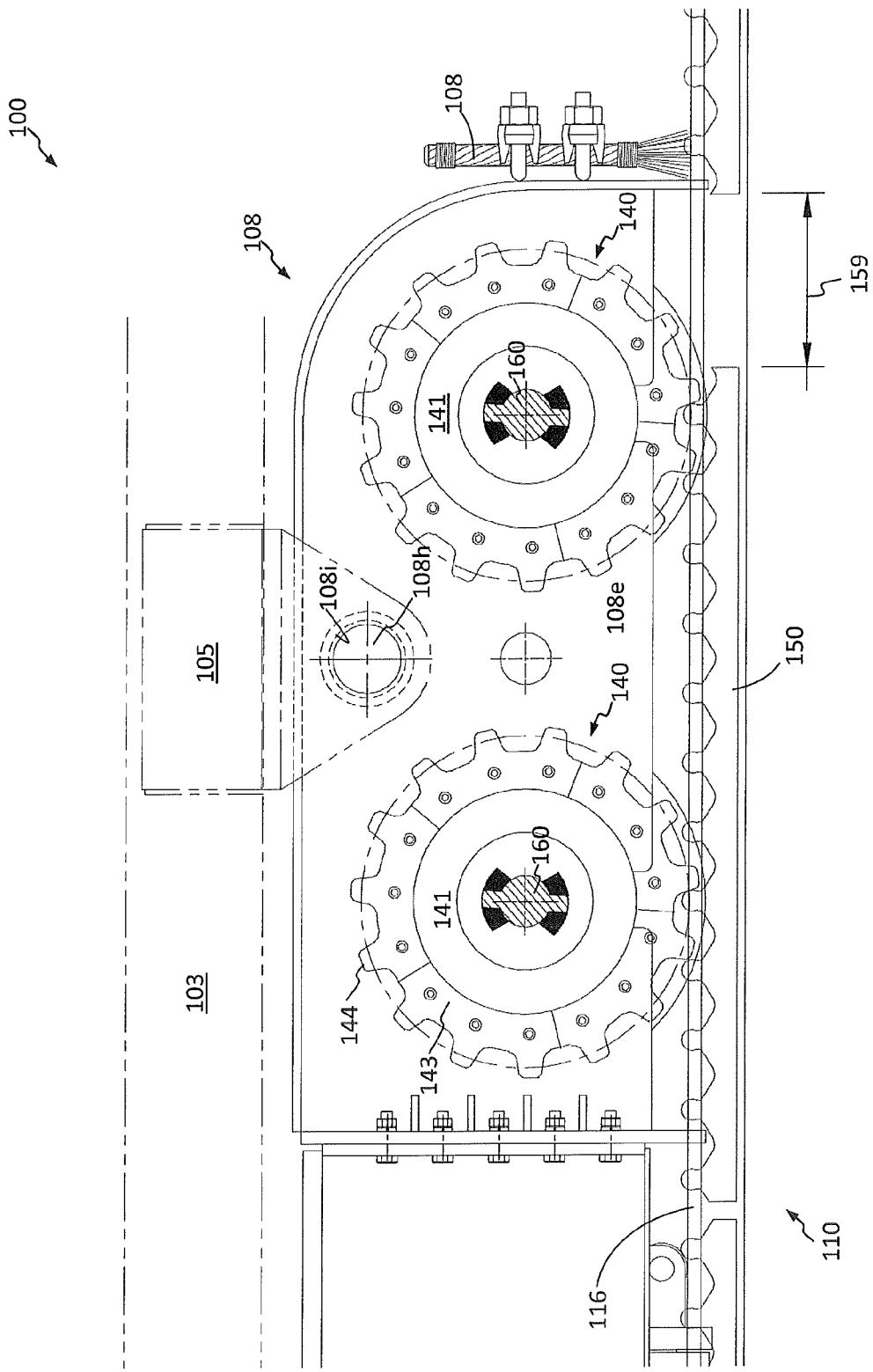
FIG. 2 is a detailed side view of the drive system shown in FIG. 1 approaching a gap between conveyor portions.

FIGS. 1-8 show a direct engagement drive system 108 for a tripper conveyor system according to some embodiments. A tripper 100 configured to rest on a conveyor 110 comprises a tripper frame 103 and feet 105, to which one or more drive systems 108 are attached. Multiple drive systems 108 may be provided to each foot 105. For example, as shown, each foot 105 may comprise two drive systems 108. Depending on which direction the tripper 100 is traveling, one of the two drive systems 108 serves as a lead drive system and the other of the two drive systems 108 serves as a follow drive system. The drive systems 108 are secured to a mount 108*e* which may be pivotally attached to each foot 105 by way of a joint 108*h* and/or a bushing 108*i*. The mount 108*e* may completely encase portions of each drive system 108 to protect components of the drive system 108 from dust and dirt ingress. For example, in some embodiments, such as the one shown, mount 108*e* may comprise a wheel box constructed of 5 steel plates welded on their sides, wherein the bottom of the wheel box is left open to allow communication between the drive system 108 and conveyor 110.

Drive systems 108 may comprise a computer or controller 108*q* such as a programmable logic controller operatively connected to one or more load sensors (not shown), a drive motor 108*a* such as a VFD-controlled electric motor with a gear reduction, a rail wheel 108*d* having a rail wheel axis 108*j* and an aperture 108*p* configured to receive and rotate freely about an outer bearing surface 164 of a drive shaft 160 extending from the drive motor 108*a*. The drive shaft 160 is supported by the mount 108*e* via bearings 190. Bearings 190 may be of any style including block bushings, roller bearings, sleeve bearings, tapered needle bearings, ball bearings, thrust bearings, hydraulic bearings, or the like, and may be secured to the mount 108*e* using any conventional means such as welding, press-fitting, screwing, or bolting using one or more fasteners 192 as shown.

A cogwheel 140 having a spring hub 141 is operatively coupled to the drive shaft 160 so that the shaft 160 is capable of providing a torque to the cogwheel. However, the cogwheel 140 is free to rotate a small amount about the drive shaft 160 via bearing surfaces 149a and 164.

In the embodiment shown, the drive shaft 160 comprises at least one torque transfer member 162. A shock or spring member such as a compression spring 170 or a torsion spring 172 is provided between the at least one torque transfer member 162 of the drive shaft 160 and a torque transfer surface 149b forming part of an aperture 149 in the spring hub 141. Those of ordinary skill in the art will appreciate that other arrangements may be utilized.

Figure 3:
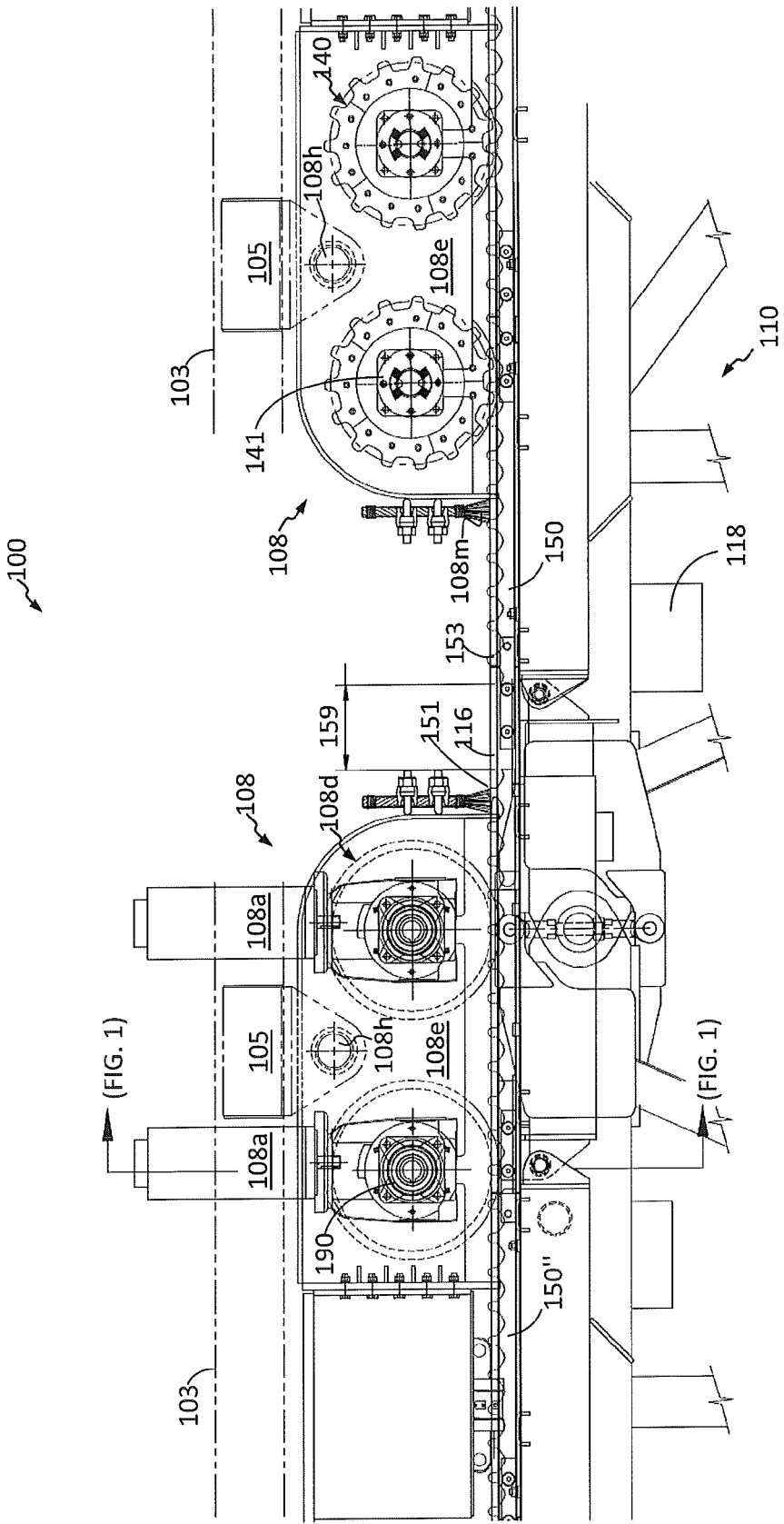
FIG. 3 depicts a broad side view of the drive system shown in FIGS. 1 and 2, in two different depths of field.
Figure 4:
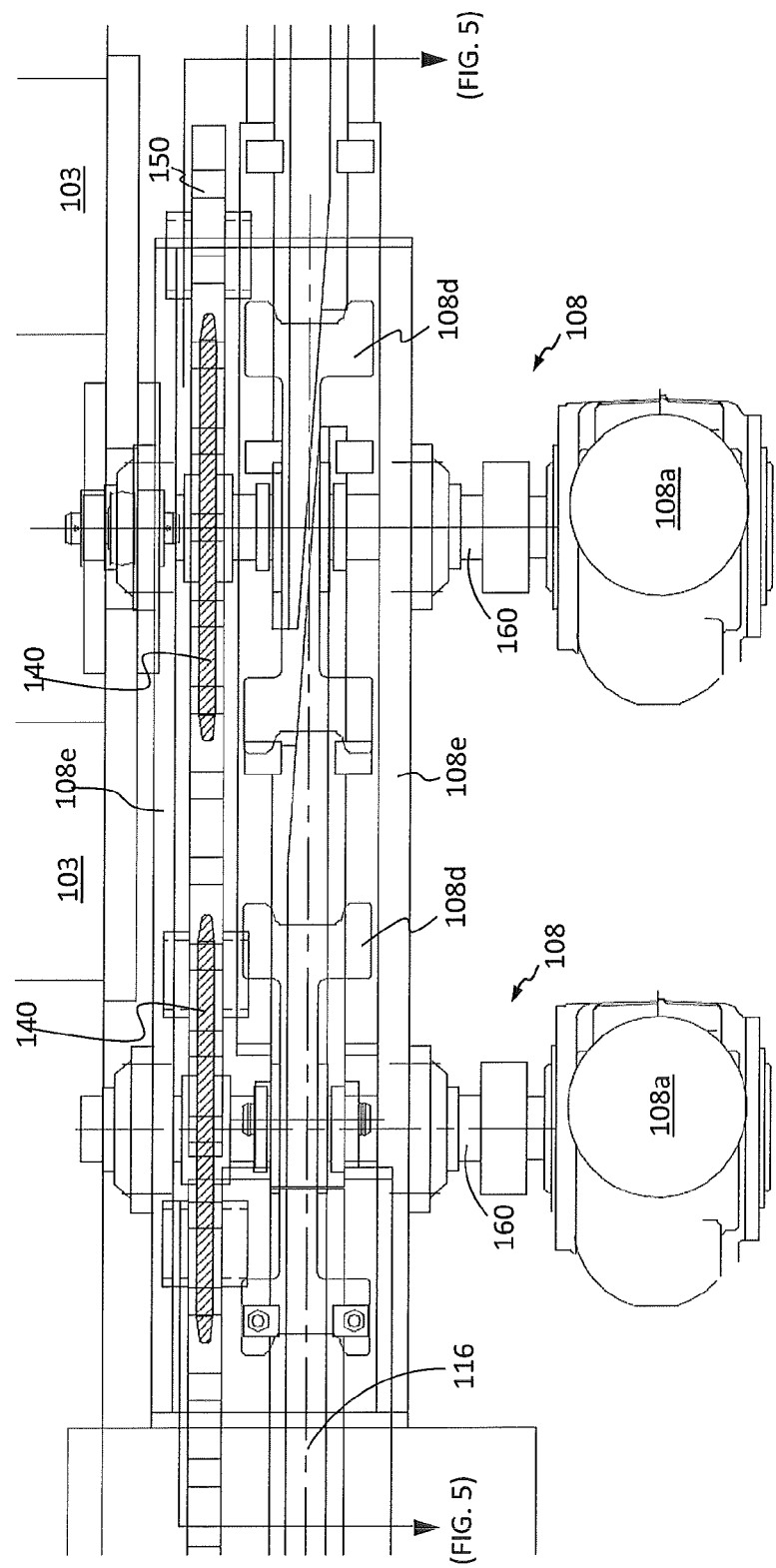
FIG. 4 depicts a transparent top plan view of the drive system shown in FIGS. 1-3.
Figure 5:
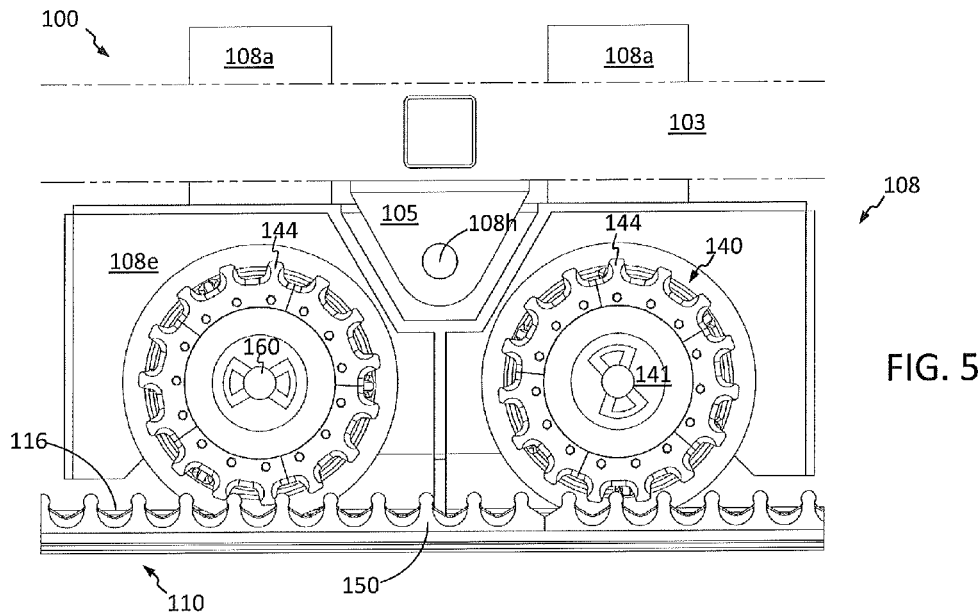
FIG. 5 shows a drive system for a tripper directly engaging the conveyor as viewed from the section line shown in FIG. 4.
Figure 6:
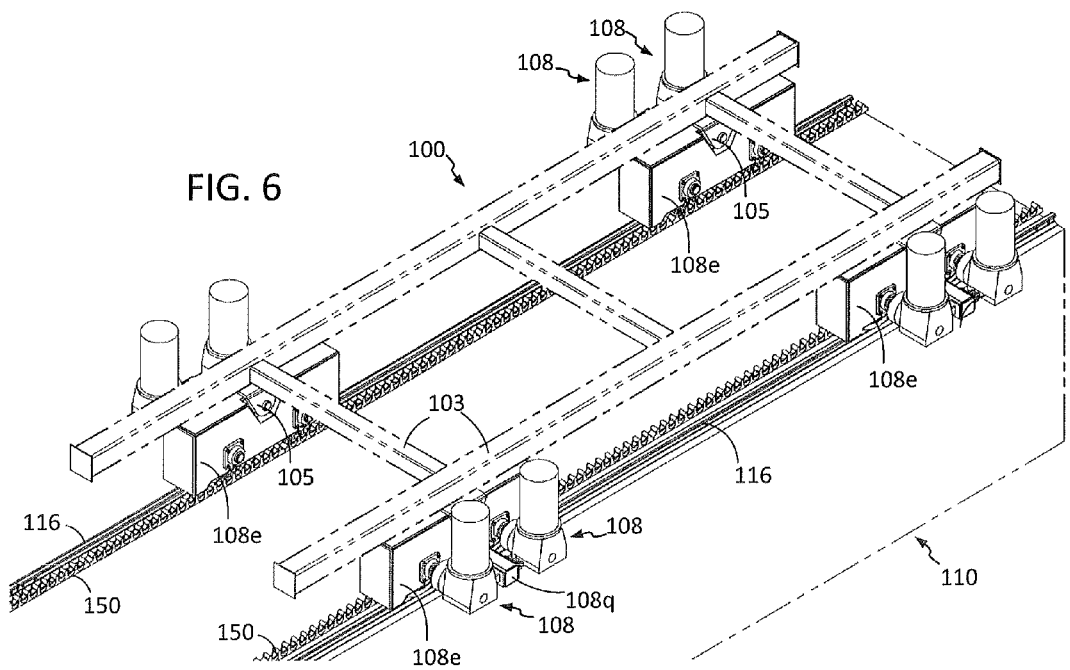
FIG. 6 is an isometric view of a lower chassis of a rail machine such as a tripper, a mobile hopper, a maintenance vehicle, a stacking machine, a conveying device, or a crane, employing drive systems according to the embodiment shown in FIGS. 1-5.

The spring 170, 172 in the spring hub 141 compensates for small misalignments between teeth 144 of the cogwheel and teeth 154 on a cog rail 150 which is provided on the frame 118 of the conveyor 110. As shown in FIG. 3, if the conveyor 110 is formed from multiple conveyor frame segments which are bolted or hinged together, a gap 159 of unknown length may be present between the last tooth 151 of a first section 150" of a cog rail 150 and a first tooth 153 of a second section 150' of a cog rail 150. Such gaps 159 are generally inconsistent and may vary in length depending on the relative orientations of two adjacent conveyor sections. For example, in some instances, gaps 159 may not exceed a few inches, whereas in other instances, gaps 159 may be larger. Typically, gaps 159 will be less than one foot (e.g., between approximately 0.5 inches and 6 inches for a ±2.5 inch movement tolerance between conveyor frame sections). FIG. 3 shows identical front and rear direct engagement drives 108. The left hand side of FIG. 3 more clearly shows rail wheels 108d, bearings 190 and motor drives 108a, whereas the right hand side of FIG. 3 more clearly shows cogwheels 140 and spring hubs 141.

Figure 20:
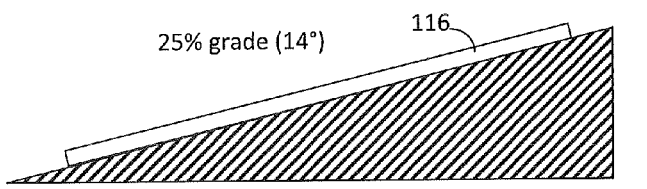
FIG. 20 schematically illustrates an acceptable operational condition for tripper drive systems according to embodiments of the invention.
Figure 21:
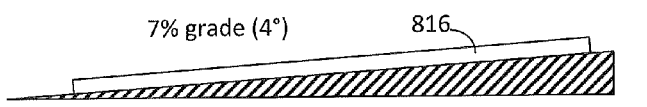
FIG. 21 schematically illustrates an acceptable operational condition for conventional tripper drive systems.
Figure 22:
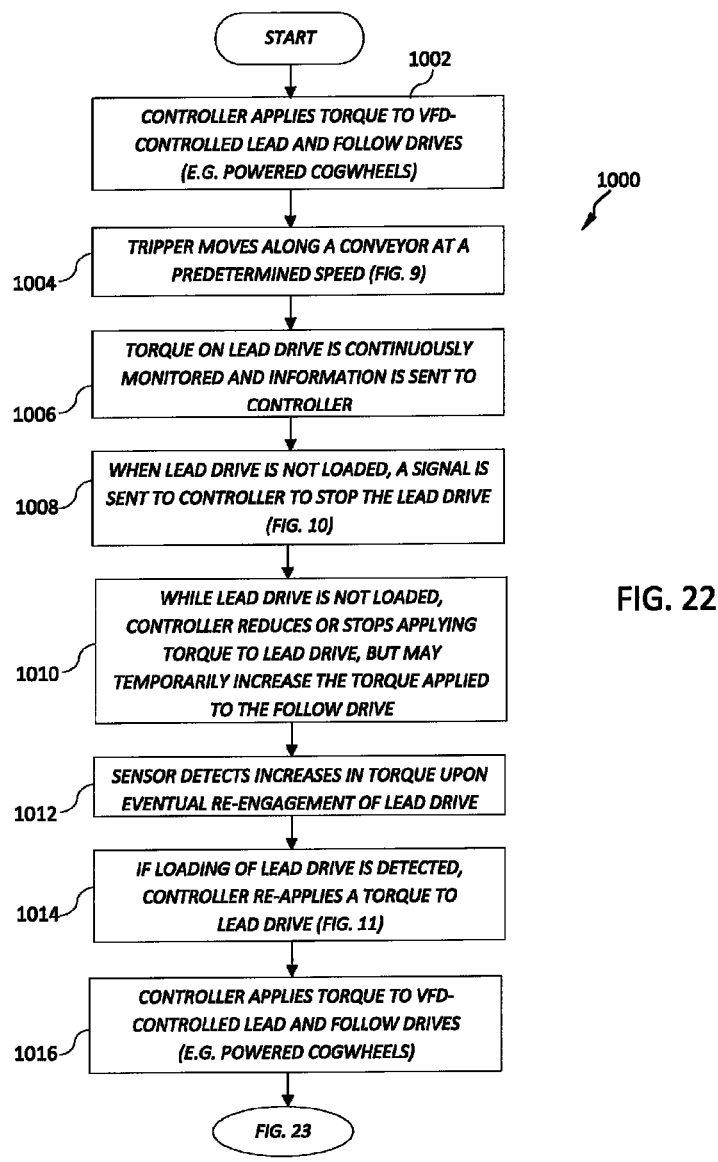

The tripper 100 moves along the conveyor 110 by applying a torque to cogwheels 140, which, in turn move the tripper frame 103 along cog rail 150. The rail wheels 108d provided to each drive system 108 spin freely around drive shaft 160 and rest on a wheel rail 116 located parallel and proximate to the cog rail 150 on the conveyor frame 118. One or more other free-spinning idle wheels may be provided for extra support and weight distribution. As shown in FIG. 20, an acceptable wheel rail 116 inclination angle may be as high as roughly 14 degrees from horizontal (i.e., a 25% grade) during safe operation. One or more debris deflectors or brushes 108m may be provided to any one of the mount 108e, foot 105, or tripper frame 103 to clear one or both of the cog rail 150 and wheel rail 116 from dirt, dust, debris, or other material. The conveyor frame 118 comprises a plurality of belt rollers 180 to support a belt and material it supports.

Figure 7:
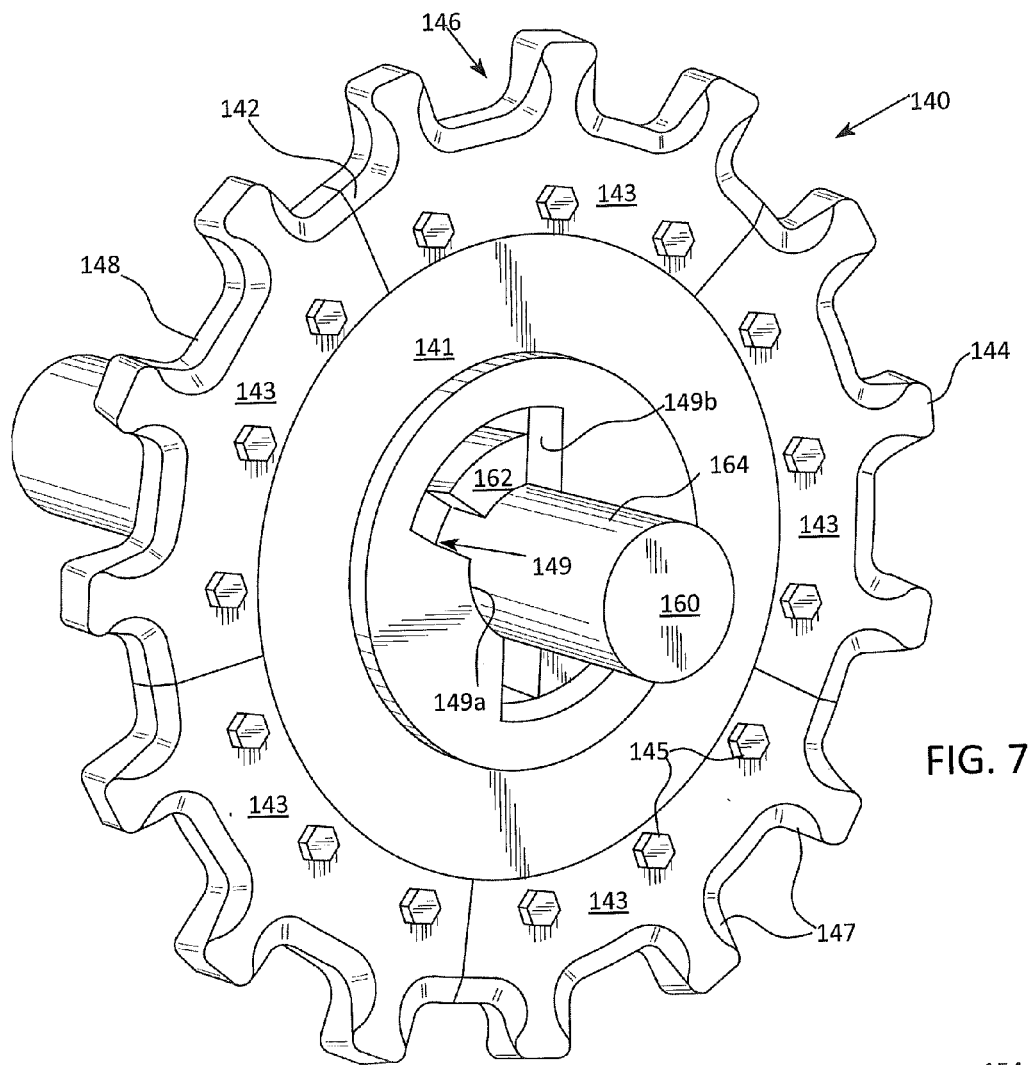
FIGS. 7 and 8 are detailed views of a cog and cog rail, respectively, according the embodiment shown in FIGS. 1-6.
Figure 8:
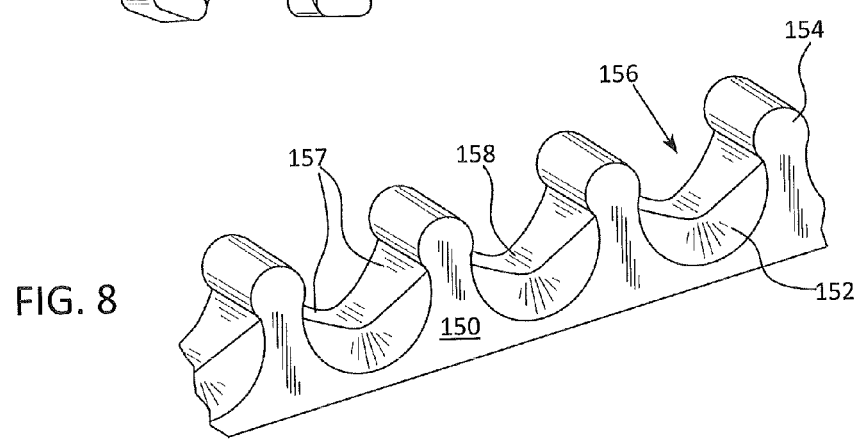

FIGS. 7 and 8 show details of a cogwheel 140 and cog rail 150 according to some embodiments. As shown, cogwheel 140 may comprise a plurality of radially-extending, circumferentially-spaced teeth 144 separated by valleys 146. Valleys 146 may comprise a root surface 148 sandwiched between tooth faces 147 which may be planar or cammed (e.g., involute) to better transition between cog rail teeth 154 without a loss in transmission efficiency. Tooth faces 147 may be oriented at different relative angles depending on design factors such as the diameter of cogwheel 140. The edges surrounding each tooth 154 and valley 156 may be snowed on each side by a swept chamfer 142 which allows for the removal and egress of material which may build up on cog rail 150 and potentially interfere with smooth engagement between the cogwheel 140 and cog rail 150 (i.e., a "self-cleaning cog" feature). In order to expedite routine maintenance and reduce the costs and time required for replacing wear parts, cogwheel 140 may comprise a central spring hub 141 permanently connected with drive shaft 160 in the arrangement previously discussed, to which one or more replaceable outer sections 143 are secured using fasteners 145. When the teeth 144 of the cogwheel 140 wear out, the sections 143 are simply removed and replaced with new ones.

Figure 17:
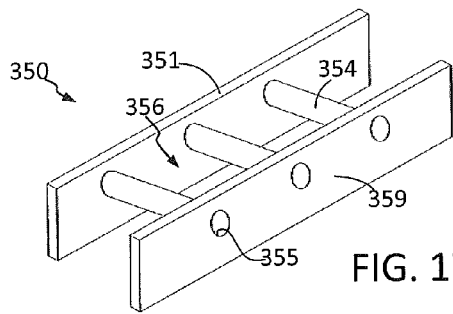
FIG. 17 illustrates a portion of a drive system for a tripper according to yet other embodiments.

Similar to the cogwheel 140, the cog rail 150 comprises a number of alternating teeth 154 and valleys 156. The edges surrounding the valleys 156 are also snowed with chamfers 152 to allow egress of material which might otherwise impede engagement between the cog rail 150 and cogwheel 140. Moreover, each valley 156 comprises a root 158 and one or more faces 157 defining each tooth 154. Faces 157 may be planar or cammed (e.g., involute) to allow better engagement and disengagement with the cogwheel teeth 144 without a loss in transmission efficiency. It will be understood to those having an ordinary skill in the art that tooth geometries may vary from what is shown in order to reduce manufacturing costs or suit different applications. For example, while the cog rail 150 shown in FIG. 8 is a monolithic structure, a rack rail assembly 350 such as the one shown in FIG. 17 may instead be provided, wherein the rack rail assembly 350 is constructed by placing parallel pin teeth 354 between parallel side plates 351, 359 and temporarily (e.g., bolting) or permanently (e.g., welding) the assembly together. Valleys 356 formed between each pin tooth 354 provide a space for cog teeth 144 to occupy. In the particular embodiment shown, teeth 354 are pressed or welded into apertures 355 provided in the parallel side plates 351, 359.

FIGS. 14a and 14b schematically illustrate the operation of a spring hub 141 according to some embodiments. The hub 141, having an aperture 149 extending therethrough, surrounds drive shaft 160 of the drive motor 208a. The hub 141 is at least partially permitted to rotate about the shaft 160 by an inner bearing surface 149a provided in the aperture 149. The bearing surface 149a rides along an outer bearing surface 164 of the drive shaft 160. Relative rotational movement between the spring hub 141 and drive shaft 160 is limited by one or more torque transfer members 162 and one or more torque transfer surfaces 149b. Spring means, such as one or more compression springs 170 as shown, is provided between the hub 141 and shaft 160 to dampen relative movement therebetween, while still allowing torque to transmit from the drive shaft 160 to the hub 141. FIG. 14a shows an unloaded spring hub assembly, and FIG. 14b shows a spring hub assembly wherein an input torque has been provided to the drive shaft 160 while a cogwheel 140 is operatively engaged with a cog rail 150. The ability of the spring hub 141 to move slightly with respect to the drive shaft 160 allows cog teeth 144, pin teeth 444, or threads of a worm 540 to align with teeth of a cog rail 150 or rack 350, 450, 550 without impingement. The spring hub 141 facilitates smooth meshing transitions, softer tooth engagements/disengagements, reduces or eliminates shock between cog rail/rack gaps 159, and promotes quiet operation and reduced wear.

FIGS. 15a and 15b schematically illustrate the operation of a spring hub 141 according to other embodiments. The spring means provided between the hub 141 and shaft 160 is a torsion spring 172 connected at one end to the hub 141 and to the drive shaft 160 at the other end. It should be known that other means for dampening small movements between hub 141 and drive shaft 160 while still allowing torque transfer may be employed. For example, small shock cylinders or elastomeric compression grommets may be provided between spring hub 141 and drive shaft 160. The spring hubs 141 disclosed generally work the same regardless of whether a cogwheel 140 is rotating clockwise or counter-clockwise, thereby providing the same amount of dampening no matter which direction a tripper 100 moves along a conveyor 110.

Figure 16:
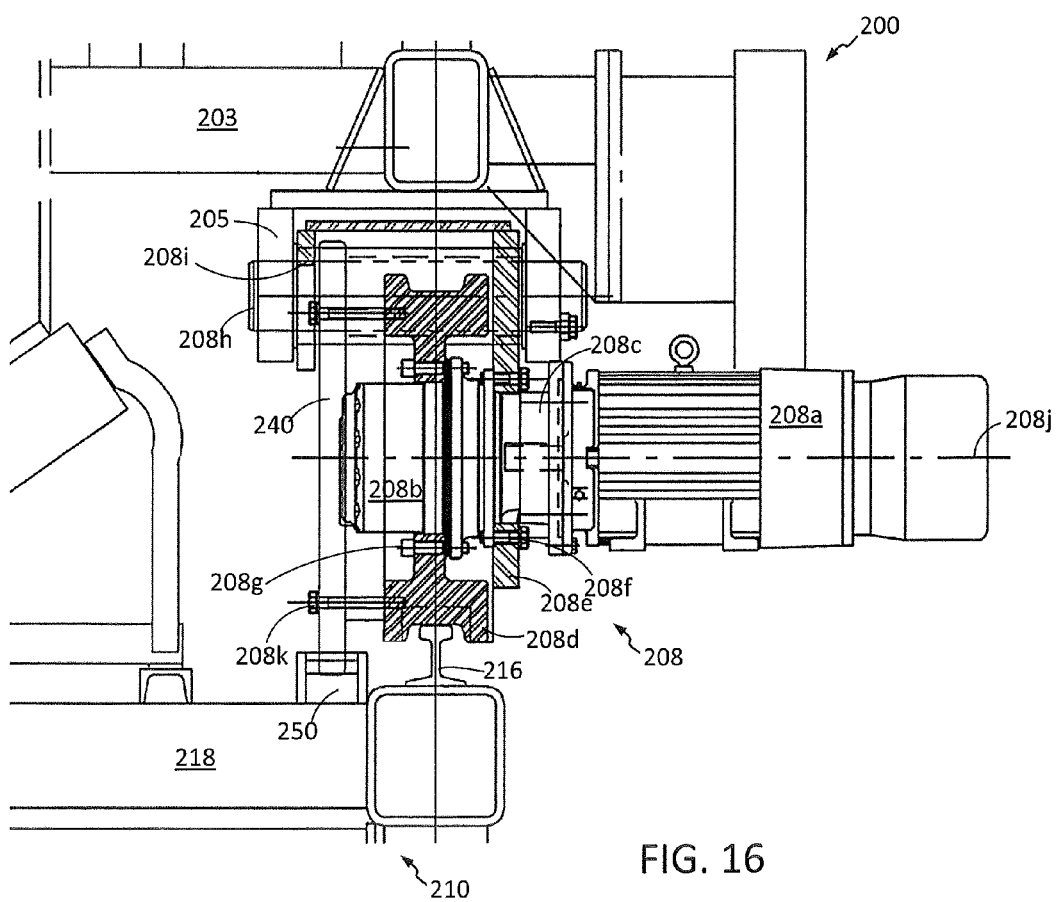
FIG. 16 illustrates a drive system for a tripper according to other embodiments.

FIG. 16 shows a tripper 200 having a direct engagement tripper drive system 208 according to other embodiments. The tripper 200 comprises a tripper frame 203 and a mount 208e which is pivotally supported by a lower foot 205, a joint 208h, and a bushing 208i. The tripper 200 rests on the frame 218 of a conveyor 210 via a rail wheel 208d having a wheel axis 208j. The rail wheel 208d is mechanically driven by a drive motor 208a. The rail wheel 208d supports the weight of the tripper 200 and rides along a wheel rail 216 provided on the conveyor frame 218. Parallel to the wheel rail 216 and extending along a length of the conveyor frame 218, is a cog rail 250 which is configured to be engaged by a cogwheel 240. The cogwheel 240 forms a portion of drive system 208 and may be bolted to the rail wheel 208d with fasteners 208k as shown. In this particular embodiment, both the cogwheel 240 are driven by the motor drive motor 208a. The drive motor 208a is mounted to a planetary gear train input 208c and secured to mount 208e with one or more fasteners 208f. The cogwheel 240 and rail wheel 208d are operatively coupled to a planetary gear train output 208b by a number of fasteners 208g, 208k. The planetary gear train output 208b rotates with respect to the planetary gear train input 208c. A spring hub (not shown) such as the ones shown and described in FIGS. 14a-15b may be employed between the planetary gear train output 208b and the rail wheel 208d/cogwheel 240 assembly in order to compensate for variations and gaps 159 in the cog rail 250. In some instances, the planetary gear train input 208c and planetary gear train output 208b can be replaced with a, inline or right-angle gearbox as would be appreciated by those having an ordinary skill in the art. In the event of the latter, the cogwheel 240 and rail wheel 208d would be coupled to an output drive shaft of said gearbox and would rotate with the drive shaft in a similar manner.

Figure 18:
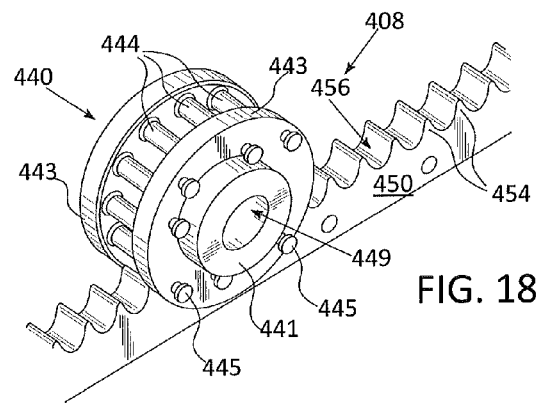
FIG. 18 illustrates a portion of a drive system for a tripper according to further embodiments.

FIG. 18 shows a portion of a direct engagement drive system 408 for a tripper according to other embodiments of the invention. The drive system 408 comprises a driven lantern pinion 440 operatively coupled to a tripper, the pinion 440 comprising a spring hub 441, a plurality of parallel pin teeth 444 secured between side plates 443 with a number of fasteners 445, and an aperture 449 configured to receive a drive shaft. The pin teeth 444 communicate with valleys 456 and contact teeth 454 on a pinion rack 450 which is provided on a conveyor. In use, a torque is applied to the pinion 440 to move the tripper along the conveyor.

Figure 19:
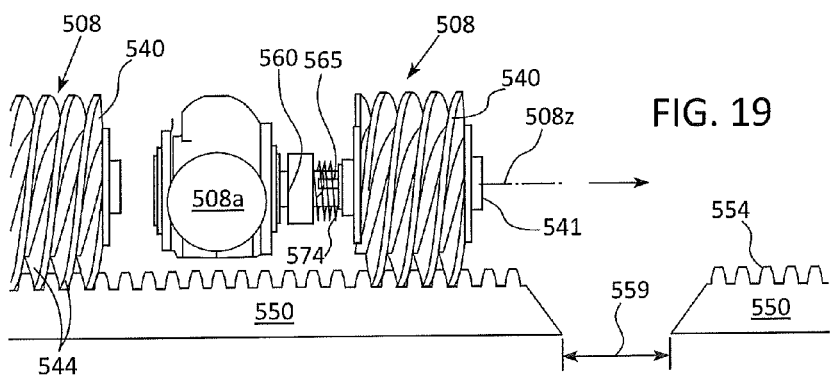
FIG. 19 illustrates a portion of a drive system for a tripper according to yet even other embodiments.

FIG. 19 shows yet another embodiment of a direct engagement tripper drive 508 which may be practiced with the invention. Rather than a cog or pinion, a drive motor 508a may be operatively coupled to one or more specially-designed worm gears 540 which traverse along a rack 550. In the particular embodiment shown, the axis 508z of the worm gear 540 and drive shaft 560 is parallel with the rack 550. As the worm rotates, it pulls a tripper along the rack 550 and, accordingly, along a conveyor (not shown) supporting the rack 550. A spring hub 541 such as the ones shown in FIGS. 14a-15b may be employed between the worm 550 and the drive shaft 560 of drive motor 508a to compensate for any gaps 559 which may be present in rack 550 along a length of the conveyor. Additionally, the spring hub 541 may non-rotationally engage and follow an axial keyway or track 565 provided in the drive shaft 560 and compress against an alignment spring 574. The alignment spring 574 helps reduce impingement or cross threading between the worm 540 and rack when traversing any gaps 559 which may be present in rack 550 by linearly de-coupling the worm 540 from the drive shaft 560.

FIGS. 9-13, 22, and 23 illustrate a method 1000 of moving a tripper 100 along a conveyor 110, particularly a conveyor comprising multiple frame sections bolted together in series, wherein a gap 159 may be present between a first rail cog rail section 150" and a second cog rail section 150'. A control system 108q is employed which comprises an electrical circuit, a torque or load sensor, a programmable logic controller (PLC) and at least two variable frequency drive-controlled (VFD) electric drive motors 108a. A cogwheel 140 (or alternatively, a pinion 440 or worm 540) is attached to each drive motor 108a. Depending on the relative direction of movement of travel of the tripper 100, at least one of said cogwheels 140 serves as a lead cogwheel 140', and another of said cogwheels serves as a follow cogwheel 140". The control system 108q provides the ability to independently control the angular orientation, torque, or power applied to each of the lead 140' and follow 140" cogwheels.

Figure 9:
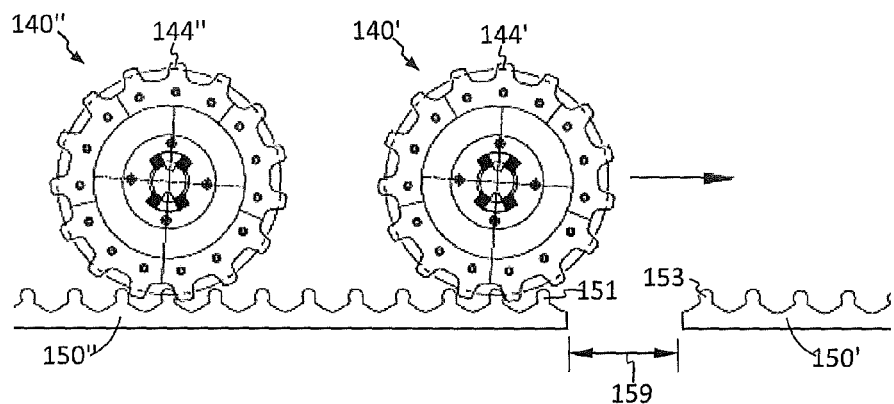
FIGS. 9-13 schematically illustrate the operation of a tripper drive system as it traverses a gap according to some embodiments.
Figure 10:
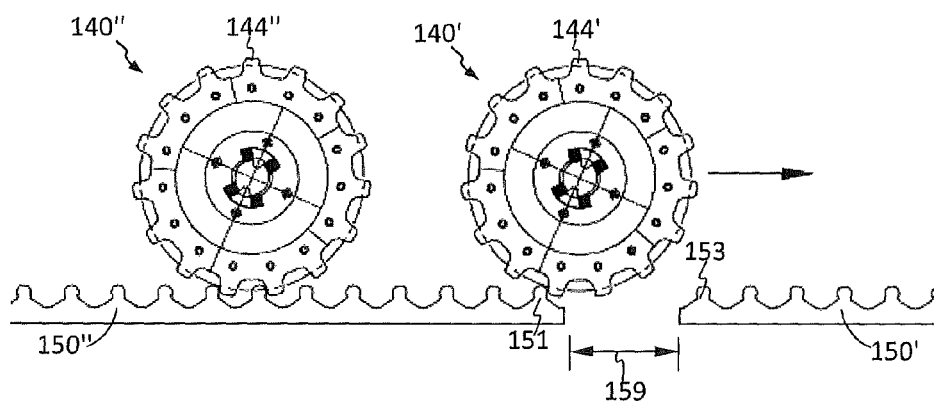

As shown in FIG. 9, during normal operation, if it is desired to move a tripper 100 along a conveyor 110, the controller 108q sends a signal to the variable frequency drives, and a controlled current is sent 1002 to both drive motors 108a, thereby applying a predetermined torque to each of the lead 140' and follow 140" cogwheels which is sufficient to move the tripper with respect to the conveyor. The tripper then moves along the conveyor at a predetermined speed 1004. Torque on the motor 108a driving the lead cogwheel 140' is continuously measured 1006 by the torque or load sensor while the tripper is in transit (loop feedback). When the lead cogwheel 140' disengages the last tooth 151 of the first cog rail section 150', and no loading or a decreased loading on the drive motor 108a operating the lead cogwheel 140' is sensed by the sensor, a signal is sent 1008 to the controller 108q. Thereafter, as shown in FIG. 10, the controller 108q and accompanying VFD temporarily decreases or stops all current sent to the drive motor 108a supporting the lead cogwheel 140'.

For the short duration of time the lead cogwheel 140' has reduced or zero rotational speed and is traversing gap 159 (which may range for instance, between a ¹⁄₁₀th of a second to a few seconds), the controller 108q and accompanying VFD may temporarily increase 1010 the amount of current applied to the drive motor 108a supporting the follow cogwheel 140" so as to overdrive it momentarily. In doing so, the momentum of the tripper 100 may not be disturbed as it crosses gap 159, despite the temporary ineffective lead cogwheel 140'.

Figure 11:
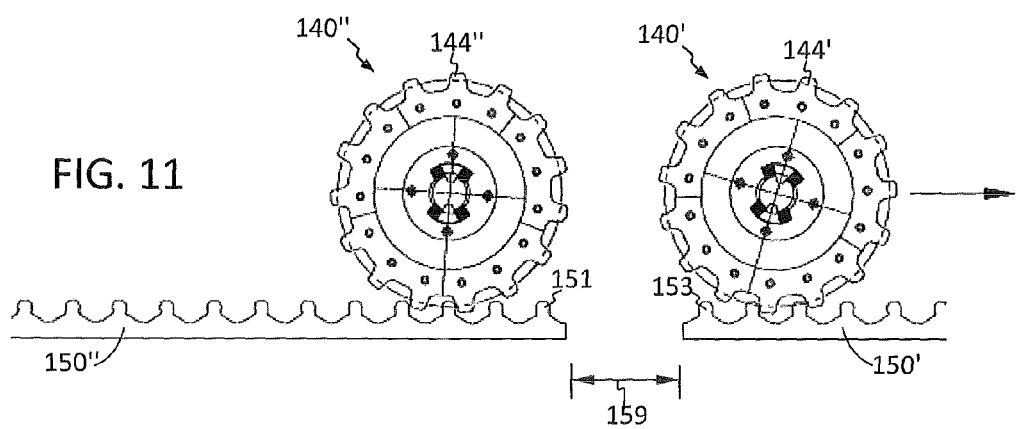

Eventually, the lead cogwheel 140' makes contact with a first tooth 153 of the second cog rail section 150', at which point the torque/load sensor senses a change in loading when tooth 144' contact is re-established 1012. The drive system 108 is programmed to respond accordingly by sending a signal to the controller 108q indicating that tooth re-engagement and/or contact has occurred. Since the distance of gap 159 may vary between cog rail sections 150', 150", a tooth 144' of the lead cogwheel 140' may be engaged nicely, aligned to mesh nicely, or otherwise aligned to impinge or impinging on first tooth 153. A spring hub 141 may be provided to the lead cogwheel 140' to help accommodate and compensate for misalignments, at which point: 1) current may be redelivered 1014 to the motor 108a driving the lead cogwheel 140' and 2) any additional current which may have been temporarily applied to the drive motor of the follow cogwheel 140" may be restored to normal functioning levels 1016. FIG. 11 schematically shows torque being applied to both lead 140' and follow 140" cogwheels. In addition to spring hub 141, sloppy joint connections, chamfers, larger clearances, and/or greater tolerances may be strategically utilized to prevent tooth binding between the first tooth 153 and lead cogwheel teeth 144' during re-engagement.

Figure 12:
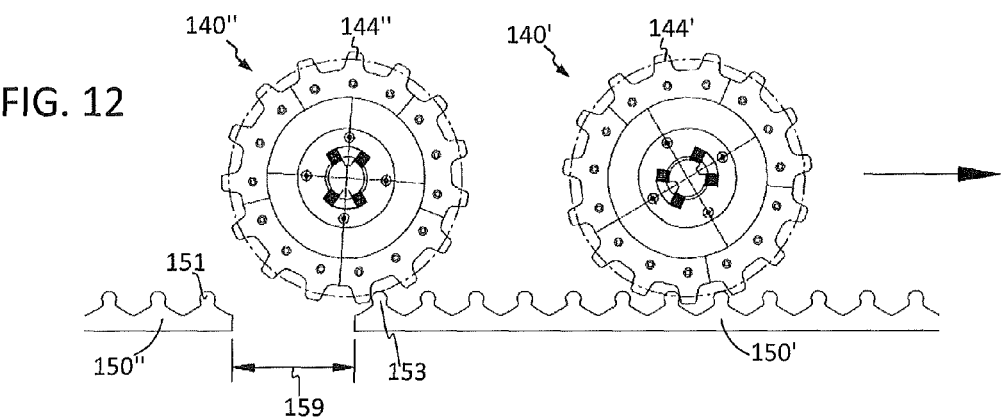

While the lead cogwheel 140' is engaged with the second cog rail section 150' and the follow cogwheel 140" is still engaged with the first cog rail section 150', the tripper 100 continues to move 1018 along the conveyor at a predetermined speed. Torque on the follow cogwheel 140" is continuously monitored 1020. Once the follow cogwheel 140" leaves the first cog rail section 150" and is no longer loaded, torque/load sensors send a signal 1022 to the controller 108q. Thereafter, the controller 108q and VFD reduces or stops current to the motor driving the follow cogwheel 140" to slow or pause rotation of the follow cogwheel 140" (FIG. 12).

For the short duration of time the follow cogwheel 140" has a reduced or zero rotational speed and is traversing gap 159 (which may range for instance, between a ⅒th of a second to a few seconds), the controller 108q and accompanying VFD may temporarily increase 1024 the amount of current applied to the drive motor 108a supporting the lead cogwheel 140' so as to overdrive it momentarily. In doing so, the momentum of the tripper 100 may not be disturbed as it crosses gap 159, despite the temporary ineffective follow cogwheel 140".

Figure 13:
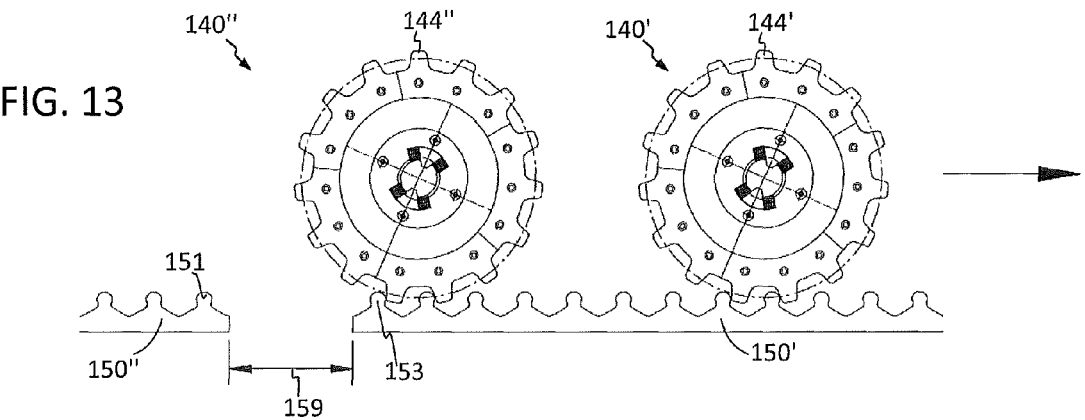

Eventually, the follow cogwheel 140" makes contact with a first tooth 153 of the second cog rail section 150', at which point the torque/load sensor senses a change in loading when tooth 144" contact is re-established 1026. The drive system 108 is programmed to respond accordingly by sending a signal to the controller 108q indicating that tooth re-engagement and/or contact has occurred. Since the distance of gap 159 may vary between cog rail sections 150', 150", a tooth 144" of the follow cogwheel 140" may be engaged nicely, aligned to mesh nicely, or otherwise aligned to impinge or impinging on first tooth 153. A spring hub 141 may be provided to the follow cogwheel 140" to help accommodate and compensate for misalignments, at which point: 1) current may be redelivered 1026 to the motor 108a driving the follow cogwheel 140" and 2) any additional current which may have been temporarily applied to the drive motor of the follow cogwheel 140" may be restored to normal operating levels 1030. FIG. 13 schematically shows torque being applied to both lead 140' and follow 140" cogwheels after traversing gap 159. Torque on the lead 140' and follow 140"cogwheels are continuously monitored, and the process repeats itself when the tripper 100 crosses a subsequent gap 159 between conveyor sections. In addition to spring hub 141, sloppy joint connections, chamfers, larger clearances, and/or greater tolerances may be strategically utilized to prevent tooth binding between the first tooth 153 and follow cogwheel teeth 144" during re-engagement.

A contractor or other entity may provide a direct engagement tripper drive system or operate a tripper drive system according to a process in whole, or in part, as shown and described. For instance, the contractor may receive a bid request for a project related to designing a tripper drive system or process, or the contractor may offer to design such a system or a process for a client. The contractor may then provide, for example, any one or more of the devices or features thereof shown and/or described in the embodiments discussed above. The contractor may provide such devices by selling those devices or by offering to sell those devices. The contractor may provide various embodiments that are sized, shaped, and/or otherwise configured to meet the design criteria of a particular client or customer. The contractor may subcontract the fabrication, delivery, sale, or installation of a component of the devices disclosed, or of other devices used to provide said devices. The contractor may also survey a site and design or designate one or more storage areas for stacking the material used to manufacture the devices. The contractor may also maintain, modify, or upgrade the provided devices. The contractor may provide such maintenance or modifications by subcontracting such services or by directly providing those services or components needed for said maintenance or modifications, and in some cases, the contractor may modify an existing drive system with a "retrofit kit" to arrive at a modified process or conveyor system comprising one or more method steps, devices, or features of the systems and processes discussed herein.

Although the invention has been described in terms of particular embodiments and applications, one of ordinary skill in the art, in light of this teaching, can generate additional embodiments and modifications without departing from the spirit of or exceeding the scope of the claimed invention.

For example, it is envisaged that other safety features may be employed to the drive systems disclosed, such as redundant emergency brakes and safety locks in the event of system failure. Such brakes or locks may, for example, include disengageable overrunning clutches/freewheels which allow the cogwheels to rotate in only one direction to advance a tripper uphill, but prevent accidental downhill tripper movement from slippage. An operator would override the clutches to allow the tripper to move along the conveyor downhill. In other instances, a retrofit kit may be provided which comprises a series of bolt-on direct engagement rails (e.g., cog rail or rack) which are configured for mounting to a conventional overland conveyor. As another example, variable frequency-controlled (VFD) electric motors may be replaced with hydraulic motors which are controlled by a programmable logic controller (PLC) operatively connected to a circuit of valves, gauges, sensors, compressors, conduit, and pressure accumulators. For example, an inclinometer continuously monitors the angle of the tripper conveyor with respect to true horizon and sends the information to the PLC via an electrical signal. When the inclination or load increases, the PLC increases the output of a variable-displacement pump which controls flow to the hydraulic motor (e.g., hydrostatic transmission). Alternatively, when the inclination or load increases, the PLC may increase inputs to a proportional or servovalve powered by a constant-pressure source (e.g., a pressure compensated pump) which overdrives the hydraulic motor. As discussed and shown in FIGS. 9-13, 22, and 23, when no load is sensed on a lead drive, the PLC may temporarily slow or stop the hydraulic motor associated with the lead drive until it re-engages a cog rail tooth.

Alternatively, a series of stepper motors may be used instead of VFD-controlled drive motors to assist with traversing cog rail gaps. The stepper motors, when not loaded while traversing a gap, rotate a cogwheel in small increments until the cogwheel teeth are smoothly engaged with a first tooth of a second section of cog rail. In some embodiments, spring hubs may be used solely and exclusively, in lieu of VFD electric motors, especially if gaps in the cog rail or rack are kept to a minimum. Moreover, although rail wheels are preferably free-spinning over drive shafts in order to make embodiments of the present invention easy to retrofit to an existing tripper, it is envisaged that rail wheels could be fixed to drive shafts and driven simultaneously in unison with the direct engagement cog, lantern pinion, or worm. Any friction, binding, or counterworking between cogs, lantern pinions, worms, rail wheels, racks, cog rails, and wheel rails (especially when traversing a gap), would be minimized by spring hubs calibrated to yield above a predetermined maximum torque or load. While the drive systems disclosed herein are shown to be used on trippers, it should be noted that they may also be advantageously used on cranes, mobile hoppers, maintenance vehicles, stacking machines, conveying devices, and/or any wheeled rail device used in mobile mining or material handling processes.

Accordingly, it is to be understood that the drawings and descriptions herein are proffered by way of example to facilitate comprehension of the invention and should not be construed to limit the scope thereof.

REFERENCE NUMERAL IDENTIFIERS 100, 200 Tripper
103, 203 Tripper Frame
105, 205 Foot
108, 208, 408, 508 Drive system
108a, 208a, 508a Drive motor
208b Planetary Gear Train Output
208c Planetary Gear Train Input Mount
108d, 208d Rail wheel
108e, 208e Mount
208f Fastener
208g Fastener
108h, 208h Joint
108i, 208i Bushing
108j, 208j Rail wheel axis
208k Fastener
108m, Brush
108p Aperture
108q Control System
110 Conveyor
116, 216, 816 Wheel Rail
118, 218 Conveyor Frame
140, 240 Cogwheel
140' Lead Cogwheel
140" Follow Cogwheel
141, 441 Spring Hub
142, 152 Chamfer
143 Outer Section
144, 154, 454, 554 Tooth
145, 445 Fastener
146, 156, 356, 456 Valley
147, 157 Face
148, 158 Root
149, 449 Aperture
149a Bearing Surface
149b Torque Transfer Surface
150, 250 Cog Rail
150' Second Cog Rail Section
150" First Cog Rail Section
151 Last Tooth
153 First Tooth
159, 559 Cog Rail Gap
160, 560 Drive Shaft
162 Torque Transfer Member
164 Outer Bearing Surface
170 Compression Spring
172 Torsion Spring
180 Belt Roller
190 Bearing
192 Fastener
350 Rack Rail
351, 359, 443 Side Plate
354, 444 Pin Tooth
355 Aperture
440 Lantern Pinion
450 Pinion Rack
508z Worm Gear Axis
540 Worm Gear
541 Spring Hub
544 Thread
550 Rack
565 Axial Keyway/Track
574 Alignment spring
1000 Method of Moving a Tripper
1002-1032 Method Steps

What is claimed is:

1. A mobile device [100] configured to move along a conveyor system [110], the conveyor system [110] having a first conveyor frame section equipped with rollers [180] to support a belt and a second conveyor frame section equipped with rollers [180] to support a belt the first conveyor frame section comprising a first elongated transmission member [150'] and the second conveyor frame section comprising a second elongated transmission member [150"], wherein a gap [159] is defined between the first elongated transmission member [150'] and the second elongated transmission member [150"]; the mobile device [100] further comprising:
a drive system [108] having at least one rotating transmission member [140], and
at least one drive motor [108a] configured to drive and control the rotation of said at least one rotating transmission member [140];
wherein the at least one rotating transmission member [140] is configured to engage said first [150'] and second [150"] elongated transmission members provided to the conveyor system [110] in order to move the mobile device [100] in relation to the conveyor system [110]; and,
wherein the mobile device [100] further comprises wheels [108d] configured to ride on rails [116] provided on the first and second conveyor frame sections, said wheels [108d] allowing the mobile device [100] to move along the conveyor system [110].

2. The mobile device [100] according to claim 1, wherein the at least one rotating transmission member [140] comprises a cogwheel, a pinion [440], or a worm [540].

3. The mobile device [100] according to claim 2, wherein the at least one rotating transmission member [140] comprises a cogwheel having teeth [144] and at least one swept chamfer [142] between each tooth [144] which is configured to shed material and prevent clogging of said cogwheel.

4. The mobile device [100] according to claim 1, wherein the at least one rotating transmission member [140] comprises a lead transmission member [140'] and a follow transmission member [140"] which are configured to rotate independently at different angular speeds.

5. The mobile device [100] according to claim 4, wherein the lead transmission member [140'] and follow transmission member [140"] are controlled by a controller [108q] and a variable frequency drive [108a].

6. The mobile device [100] according to claim 1, wherein the at least one rotating transmission member [140] comprises a spring hub [141] adapted to transmit a torque from a drive shaft [160] while still allowing some degree of rotational movement between the at least one rotating transmission member [140] and said drive shaft [160], wherein said spring hub comprises a compression spring [170] or a torsion spring [172].

7. The mobile device [100] according to claim 1, wherein the mobile device [100] is configured to operate on a conveyor system [110] oriented at an inclination angle of between approximately 0 and 14 degrees with respect to horizontal.

8. The mobile device [100] according to claim 1, wherein the mobile device [100] comprises one of a tripper, a mobile hopper, a maintenance vehicle, a stacking machine, a conveying device, or a crane which is configured to move along the first conveyor frame section and the second conveyor frame section of the conveyor system [110].

9. A conveyor system [110] comprising:
a plurality of conveyor frame sections [118] configured with rollers [118] to support a belt, wherein each conveyor frame section [118] comprises an elongated transmission member [150, 150', 150"];
wherein each elongated transmission member [150, 150', 150"] is configured to operatively engage a toothed or threaded rotating transmission member such as a cogwheel [140], a pinion [440], or a worm [540] provided on a mobile device [100], in order to move the mobile device [100] in relation to the conveyor system [110];
wherein a gap [159] is be defined between each elongated transmission member [150, 150', 150"]; and,
wherein the at least one rotating transmission member [140, 440, 540] comprises a lead transmission member [140'] and a follow transmission member [140"] which are configured to rotate independently at different angular speeds to facilitate traversing said gap [159].

10. The conveyor system [110] according to claim 9, wherein the conveyor system [110] is configured to operate at inclination angles between approximately 0 and 14 degrees with respect to horizontal.

11. The conveyor system [110] according to claim 9, wherein each elongated transmission member [150, 150', 150"] comprises a plurality of teeth [154] and valleys [156] disposed between said teeth [154].

12. The conveyor system [110] according to claim 11, wherein said teeth [154] and valleys [156] are configured to mesh with teeth [144] of a cogwheel [140], threads [544] of a worm [540], or pin teeth [444] of a lantern pinion [440].

13. The conveyor system [110] according to claim 11, wherein each elongated transmission member [150, 150', 150"] comprises a cog rail having at least one swept chamfer [152] between each tooth [154] which is configured to shed material and prevent clogging of said cog rail.

14. A method of moving a mobile device [100] along a conveyor system [110] comprising:
providing a mobile device [100] having a drive system [108], the drive system [108] comprising a controller [108q] having a sensor, a first rotating transmission member [140'] operatively coupled to a first drive motor, and a second rotating transmission member [140"] operatively coupled to a second drive motor and spaced from the first rotating transmission member [140'];
providing a conveyor system [110] comprising a first conveyor frame section equipped with rollers [180] to support a belt and a second conveyor frame section equipped with rollers [180] to support a belt, the first conveyor frame section further comprising a first elongated transmission member [150'] and the second conveyor frame section further comprising a second elongated transmission member [150"], wherein a gap [159] is defined between the first elongated transmission member [150'] and the second elongated transmission member [150"];
reducing or stopping a torque applied to at least one of the first [140'] or second [140"] rotating transmission members when said at least one of the first [140'] or second [140"] rotating transmission members is proximate the gap [159], but not engaged with one of the first [150'] or second [150"] elongated transmission members; and
maintaining or increasing a torque applied to the first rotating transmission member [140'] when the first rotating transmission member [140'] is engaged with one of the first [150'] or second [150"] elongated transmission members.

15. The method according to claim 14, further comprising the step of reducing or stopping a torque applied to at least one of the first [140'] or second [140"] rotating transmission members when said at least one of the first [140'] or second [140"] rotating transmission members is proximate the gap [159], and slightly disengaged with one of the first [150'] or second [150"] elongated transmission members.

16. The method according to claim 14, further comprising the step of maintaining or increasing a torque applied to at least one of the first [140'] or second [140"] rotating transmission members when said at least one of the first [140'] or second [140"] rotating transmission members is proximate the gap [159'], and slightly re-engaged with one of the first [150'] or second [150"] elongated transmission members.

17. The method according to claim 14, further comprising the step of providing a spring hub [141] to at least one of the first rotating transmission member [140'] and the second [140"] rotating transmission member, in order to compensate for small misalignments with respect to said first [150'] and second [150"] elongated transmission members, wherein said spring hub comprises a compression spring [170] or a torsion spring [172].

18. A mobile stacking system comprising:
a mobile device [100] having a drive system [108], the drive system [108] comprising a controller [108q] having a sensor, a first rotating transmission member [140'] operatively coupled to a first drive motor [108a], and a second rotating transmission member [140"] operatively coupled to a second drive motor [108a] and spaced from the first rotating transmission member;
a conveyor system [110] comprising a first conveyor frame section [118] equipped with rollers [180] to support a belt and a second conveyor frame section [118] equipped with rollers [180] to support a belt, the first conveyor frame section comprising a first elongated transmission member [150'] and the second conveyor frame section comprising a second elongated transmission member [150"], wherein a gap [159] is defined between the first elongated transmission member [150'] and the second elongated transmission member [150"];
wherein the drive system [108] is configured to reduce or stop a torque applied to the first rotating transmission member [140'] when the first rotating transmission member [140'] is proximate the gap [159], but not engaged with one of the first [150'] or second [150"] elongated transmission members;
wherein the drive system [108] is configured to maintain or increase a torque applied to the first rotating transmission member [140'] when the first rotating transmission member [140'] is engaged with one of the first [150'] or second [150"] elongated transmission members;
wherein the drive system [108] is configured to reduce or stop a torque applied to the second rotating transmission member [140"] when the second rotating transmission member [140"] is proximate the gap [159], but not engaged with one of the first [150'] or second [150"] elongated transmission members; and
wherein the drive system [108] is configured to maintain or increase a torque applied to the second rotating transmission member [140"] when the second rotating transmission member [140"] is engaged with one of the first [150'] or second [150"] elongated transmission members.

19. The mobile stacking system according to claim 18, wherein the mobile device [100] comprises one of a tripper, a mobile hopper, a maintenance vehicle, a stacking machine, a conveying device, or a crane which is configured to move along the first conveyor frame section and the second conveyor frame section of the conveyor system [110] via wheels [108*d*] provided on the mobile device [100], the wheels [108*d*] being configured to ride on rails [116] which are provided on the first and second conveyor frame sections.

* * * * *